United States Patent
Sharma et al.

(10) Patent No.: US 9,113,498 B2
(45) Date of Patent: Aug. 18, 2015

(54) APPARATUS AND METHOD WITH ROUTING LOGIC FOR COMMUNICATIONS BETWEEN MULTIPLE BASEBAND MODEMS AND A UNIVERSAL INTEGRATED CIRCUIT CARD

(71) Applicant: Qualcomm Incorporated, San Diego, CA (US)

(72) Inventors: Jayesh Sharma, San Diego, CA (US); Shriram Ganesh, San Diego, CA (US); Michele Berionne, San Diego, CA (US); Xiaomin Zhu, San Diego, CA (US); Jose Alfredo Ruvalcaba, Winchester, CA (US); Damir Didjusto, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/741,540

(22) Filed: Jan. 15, 2013

(65) Prior Publication Data
US 2014/0066120 A1   Mar. 6, 2014

Related U.S. Application Data
(60) Provisional application No. 61/696,673, filed on Sep. 4, 2012.

(51) Int. Cl.
*H04W 88/06* (2009.01)
(52) U.S. Cl.
CPC ..................................... *H04W 88/06* (2013.01)

(58) Field of Classification Search
CPC ....... H04W 88/06; H04W 48/18; H04W 8/18; H04W 8/183; H04L 5/1438; H04M 11/06
See application file for complete search history.

(56) References Cited

U.S. PATENT DOCUMENTS

| | | | |
|---|---|---|---|
| 5,852,630 A * | 12/1998 | Langberg et al. | 375/219 |
| 7,761,636 B2 | 7/2010 | Mott et al. | |
| 7,778,603 B2 | 8/2010 | Palin et al. | |
| 8,331,355 B2 * | 12/2012 | Buckley et al. | 370/352 |
| 8,649,789 B2 * | 2/2014 | Shi et al. | 455/432.3 |
| 2008/0101446 A1 | 5/2008 | Gautier et al. | |

(Continued)

FOREIGN PATENT DOCUMENTS

KR    20100129835 A    12/2010

OTHER PUBLICATIONS

ETSI TS 102 223, V8.0.0, (Jul. 2008), "Smart Cards; Card Application Toolkit (CAT) (Release 8)", ETSI Standard, European Telecommunications Standards Institute (ETSI), Sophia Antipolis Cedex, France, vol. SCP-WG3, No. V8.0.0, Jul. 1, 2008, XP014041999.

(Continued)

*Primary Examiner* — Hirdepal Singh
(74) *Attorney, Agent, or Firm* — Stanton Braden

(57) ABSTRACT

Aspects of the present disclosure are directed to a user equipment having a universal integrated circuit card (UICC), multiple baseband modems, and routing logic for handling communications between the UICC and the baseband modems, and methods for operating the user equipment in which the routing logic arbitrates communication between the UICC and the baseband modems in accordance with arbitration logic. Other aspects, embodiments, and features are also claimed and described.

40 Claims, 8 Drawing Sheets

(56) References Cited

U.S. PATENT DOCUMENTS

| | | | |
|---|---|---|---|
| 2010/0103995 A1* | 4/2010 | Seo et al. | 375/222 |
| 2011/0066941 A1* | 3/2011 | Chipchase et al. | 715/716 |
| 2011/0117944 A1 | 5/2011 | Cao et al. | |
| 2012/0072979 A1* | 3/2012 | Cha et al. | 726/7 |
| 2012/0124229 A1 | 5/2012 | Sahu et al. | |
| 2013/0278421 A1* | 10/2013 | Sutton | 340/540 |
| 2013/0310108 A1* | 11/2013 | Altman | 455/552.1 |
| 2013/0329639 A1* | 12/2013 | Wietfeldt et al. | 370/328 |
| 2014/0169216 A1* | 6/2014 | Mansson et al. | 370/254 |

OTHER PUBLICATIONS

International Search Report and Written Opinion—PCT/US2013/058059—ISA/EPO—Jan. 21, 2014.

\* cited by examiner

APPARATUS AND METHOD WITH ROUTING LOGIC FOR COMMUNICATIONS BETWEEN MULTIPLE BASEBAND MODEMS AND A UNIVERSAL INTEGRATED CIRCUIT CARD

CROSS-REFERENCE TO RELATED APPLICATIONS

This application claims priority to U.S. Provisional Patent Application No. 61/696,673, filed on 4 Sep. 2012, which is incorporated herein by reference as if fully set forth below and for all applicable purposes.

TECHNICAL FIELD

The technology discussed in this patent application relates generally to wireless communication systems, and more particularly, to communications between multiple baseband modems and a universal integrated circuit card (UICC).

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

A wireless multiple-access communication system can support communication for multiple wireless terminals. Each terminal communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations. This communication link may be established via a single-in-single-out, multiple-in-signal-out or a multiple-in-multiple-out (MIMO) system.

A wireless terminal may include a universal integrated circuit card (UICC) or integrated circuit card (ICC) (hereafter "UICC"). For example, in a GSM network, the UICC contains a SIM application, and in a UMTS network, it contains the USIM application. In an IS-95/CDMA2000 network, the UICC contains a CSIM application. A UICC may contain several applications, making it possible for the same smart card to give access to GSM, UMTS, and IS-95/CDMA2000 networks. A card with all three features is called a removable user identity card (R-UIM).

A terminal with a UICC may support contemporaneous or concurrent communications with multiple radio access technologies (RATs) through multiple baseband modems. For example, a dual baseband modem environment may exist in which each baseband modem supports the same RAT or different RATs. In such an environment, commands issued by a UICC (e.g., proactive commands) need to get routed to the correct baseband modem. The UICC originated commands may include proactive commands that are defined with respect to card application toolkit (CAT) specifications (ETST TS 102.223 and 3GPP 31.111). In another example, 3GPP2 C.S0035-A section 6.4 for CDMA Card Application Toolkit lists a number of proactive commands. The CAT provides mechanisms which allow applications, existing in the UICC, to interact and operate with any terminal which supports the specific mechanism(s) required by the application. A system and method that provide routing logic for handling the communications between multiple baseband modems and a UICC is desired.

BRIEF SUMMARY OF SOME EXAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to a user equipment having a universal integrated circuit card (UICC), multiple baseband modems, and routing logic for handling communications between the UICC and the baseband modems, and methods for operating the user equipment in which the routing logic arbitrates communication between the UICC and the baseband modems in accordance with arbitration logic.

In one aspect, the disclosure provides a method of operating a mobile equipment for wireless communications, wherein the mobile equipment includes at least two modems and a UICC communicatively coupled to the at least two modems. The method includes arbitrating communication between the UICC and the at least two modems in accordance with arbitration logic.

Another aspect of the disclosure provides a computer program product, including a computer-readable medium including code for operating mobile equipment for wireless communications. The mobile equipment includes at least two modems and a UICC communicatively coupled to the at least two modems. The code includes arbitrating communication between the UICC and the at least two modems in accordance with arbitration logic.

Another aspect of the disclosure provides an apparatus for wireless communications. The apparatus includes: at least two modems; a UICC communicatively coupled to the at least two modems; and means for arbitrating communication between the UICC and the at least two modems.

Another aspect of the disclosure provides an apparatus for wireless communications. The apparatus includes: at least two modems; a UICC communicatively coupled to the at least two modems; a memory; and at least one processor coupled to the memory and configured to arbitrate communication between the UICC and the at least two modems based on arbitration logic.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to various aspects of the present disclosure, a user equipment (UE) has a UICC communicatively coupled with multiple baseband modems for accessing multiple radio access technologies (RATs). The UICC may be directly attached to only one of the baseband modems or all of the baseband modems. Throughout this disclosure, when a UICC is referred to be "directly coupled to" a baseband modem, the UICC is communicatively coupled to the baseband modem without other intervening baseband modems. When the UE issues proactive commands, some of the proactive commands are only applicable for specific RATs. When each baseband modem supports a different set of one or more RATs and is equipped with different feature sets, aspects of the disclosure disclose a scheme in which communication between a UICC and multiple baseband modems are correctly handled. For example, proactive commands are directed to the correct baseband modem(s), commands to and from multiple baseband modems are properly routed and consolidated, In various aspects, arbitration logic is presented for routing of proactive commands to the correct baseband modem(s) at run time and for combining feature sets of multiple baseband modems and sending consolidated communication (e.g., terminal profile information) to the UICC. Still in various aspects, arbitration logic is presented for handling terminal responses from multiple baseband modems, for example, when a proactive command is to be processed on two baseband modems, two separate terminal responses and sending a consolidated terminal response to the UICC upon execution of the proactive command.

Figure 1:
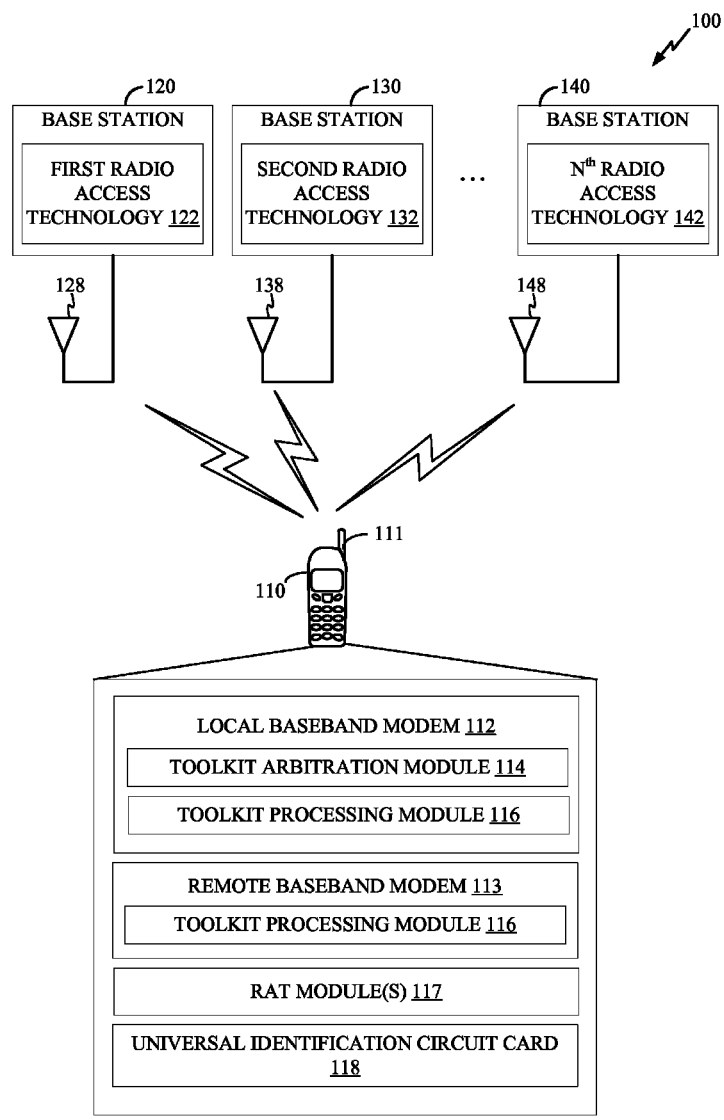
FIG. 1 depicts a block diagram of a wireless communications system in which a user equipment (UE) is capable of communicating with multiple radio access technologies (RATs) using multiple baseband modems, according to some embodiments.

FIG. 1 depicts a block diagram of a wireless communications system 100 in which a UE is capable of communicating with multiple radio access technologies (RATs) using multiple baseband modems. With reference now to FIG. 1, a system 100 includes a number of base stations 120, 130, 140 (e.g., Node-B. E-Node-B, etc.) and one or more wireless communications devices (110) (e.g., terminals, UEs), which can communicate via respective antennas 128, 138, 148, and 111. In one aspect, the base stations 120, 130, and 140 may conduct a downlink (DL) communications to UE 110 via antenna 128, 138, and 148, respectively. At the UE 110, the DL communications may be received via the antenna 111. The UE 110 may conduct uplink (UL) communications to the base stations 120 and 130 via the antenna 111. In one aspect, the antenna 111 may include multiple antennas and/or virtual antennas that are operable to support multiple RATs through multiple baseband modems (112, 113). At the base stations 120, 130, and 140, the UL communications may be received via the antennas 128, 138, and 148, respectively. Further, the base station 120 may be operable to communicate using a first RAT 122, the base station 130 may be operable to communicate using a second RAT 132, and base station 140 may be operable to communicate using an N-th RAT 142. In one aspect, the first RAT 122, the second RAT 132, and the N-th RAT 142 are different from each other. In another aspect, the first RAT 122, the second RAT 132, and/or the N-th RAT 142 may be operable to communicate using protocols, such as, but not limited to, LTE, CDMA, TDMA, FDMA, OFDMA, SC-FDMA, TD-SCDMA. Global System for Mobile Communications (GSM), Universal Terrestrial Radio Access (UTRA), Evolved UTRA (E-UTRA), etc.

The UE 110 may be operable to communicate with multiple RATs using one or more RAT modules 117 and baseband modems (112, 113). In one aspect, each RAT may be processed by a corresponding RAT module 117 associated with its own chipset. In another aspect, two or more of the RAT modules 117 may be implemented in a single chipset or multiple chipsets. Similarly, in one aspect, each RAT may be supported by a single baseband modem (112, 113). While in another aspect, multiple RATs may be supported by each baseband modem (112, 113). In one aspect, the UE 110 may include a UICC 118 (or ICC) which may store system information obtained from various sources. In one aspect, the UICC 118 may include various modules or applications such as, but not limited to, a SIM application, a CSIM application, a USIM application, etc. In another aspect, the UICC 118 may be directly coupled to the baseband modem 112. As used herein, a baseband modem that is directly coupled to the UICC 118 is referred to as the local baseband modem 112, while any baseband modem not directly coupled to the UICC 118 is referred to as a remote baseband modem 113.

The UICC 118 may contain an application toolkit (CAT). The CAT can include sets of application and related procedures that may be used during a card session. In some cases, the toolkit applications know which RAT the terminal (or baseband modem) is currently in so that the UICC 118 can issue access technology dependent proactive commands as well as determine that the response to a particular command is technology dependent. For example, the proactive command, PROVIDE LOCAL INFORMATION, can be used to provide an access technology indication. This is achieved by the toolkit application using the Access Technology command qualifier in the PROVIDE LOCAL INFORMATION command to which the terminal responds with the current access technology using the TERMINAL RESPONSE message.

The local baseband modem 112 may include a toolkit arbitration module 114 and a processing module 116. The remote baseband modem 113 may also include a toolkit processing module 116. The toolkit arbitration module 114 may be operable to provide routing logic for communications (e.g., proactive commands, profiles download, terminal responses, envelope commands, envelope response, etc.) between the baseband modems (112,113) and the UICC 118. Each baseband modem (112, 113) may use its toolkit process module 116 to process the communicated proactive command. The UICC 118 can issue a variety of commands to the baseband modems, and the modems tell the UICC 118 if the command was successful or not using the command result procedure.

In one aspect, the toolkit arbitration module 114 may be operable to provide route logic for proactive commands from the UICC 118. In one such operational aspect, at power up, the toolkit arbitration module 114 may parse a configuration file from the local baseband modem 112 that may define rules for routing proactive commands and other communications between the UICC 118 and the baseband modems. In another optional aspect, rules for routing may be hardcoded. Such information may be stored as arbitration rules in a local memory. These arbitration rules may be configured to send proactive commands to various combinations of the local baseband modem 112 and/or the remote baseband modem 113. For example, the rules may indicate to send the received command to the local modem 112 or the remote modem 113 always. In another configuration, the rules may indicate to send the received command to both the local modem 112 and remote modem 113. In another configuration, the rules may indicate to send the received command to a modem that has a subscription to a comparatively higher priority RAT that is in a normal service mode. In still another configuration, the rules may indicate to send the received command to the local modem 112 or the remote modem 113 based on a qualifier tag in the proactive command. In still another configuration, the rules may indicate to send the received command to the local modem 112 or the remote modem 113 based on availability of additional subscriptions (e.g., IMS, SMS, etc.) to the user. Further, the toolkit arbitration module 114 may be operable referring to arbitration rules, when a proactive command is received, and decide an appropriate modem or multiple modems to which the proactive command may be sent.

In one operational example, where the baseband modem 112 has access to the user interface (UI), a rule may be configured to route proactive commands like "DISPLAY TEXT," "GET INPUT," etc. to the local baseband modem 112. In another operational example, the proactive command "SET UP EVENT LIST" can be routed to both baseband modems (112, 113). Each baseband modem (112, 113) can choose the events it supports and generate a suitable terminal response and send it to the toolkit arbitration module 114 for storage and handling. In still another operational example, the proactive command "OPEN CHANNEL" may be routed to the modem with the highest priority RAT. So when the local baseband modem 112 has a subscription to a priority 2 RAT, and the remote baseband modem 113 has a subscription to a priority 1 RAT, the "OPEN CHANNEL" proactive command may be routed to the remote baseband modem 113. In still another operational example, the proactive command "PROVIDE LOCAL INFORMATION" may be routed based on a qualifier tag. For each qualifier value, a rule may indicate to which modem the proactive command is routed. For example, the remote baseband modem 113 may have a CDMA subscription, and if the qualifier value is 0x01 (e.g., CDMA location info), then the proactive command can be routed to the remote baseband modem 113.

In one aspect, the toolkit arbitration module 114 may be operable to generate a consolidated terminal profile corresponding to the baseband modems (112, 113). In such an aspect, the toolkit arbitration module 114 may cache a terminal profile from a first sender modem (112 or 113). When another modem (112 or 113) sends a terminal profile, the toolkit arbitration module 114 may consolidate the terminal profile properties and construct a consolidated terminal profile using, for example, a bitwise OR operation. Thereafter, the toolkit arbitration module 114 may send the consolidated terminal profile to the UICC 118.

In another aspect, the toolkit arbitration module 114 may be operable to generate envelope commands. For example, a set of possible menu options can be supplied by the UICC 118 using the proactive command SET UP MENU. If the UICC 118 has sent this command, and the user subsequently chooses an option or, the user requests help on it, the terminal (or baseband modem) informs the UICC 118 using envelop commands. In such an aspect, each modem may send envelope commands to the toolkit arbitration module 114 with a modem identifier (ID) that identifies the originating modem. The toolkit arbitration module 114 may collect the envelope command and send it to the UICC 118. When the toolkit arbitration module 114 receives a response back from the UICC 118, the toolkit arbitration module 114 may forward the response to the appropriate baseband modem based on the included modem ID.

In still another aspect, the toolkit arbitration module 114 may be operable to generate a consolidated terminal response. Once a baseband modem has made its attempt to execute a proactive command from the UICC 118, the baseband modem informs the UICC 118 of the success or otherwise of that command, by using a terminal response (e.g., see ETSI TS 102.233). Three overall categories of results may be defined. By way of example, the first category indicates command performed successfully. This is returned by the baseband modem for every successful command. The second category indicates temporary problem with executing command. The third category indicates permanent problem with executing command. Other categories are also possible.

The terminal response may provide the corresponding proactive command details, a general result, and sometimes more specific information. In such an aspect, the toolkit arbitration module 114 may be aware if the proactive command was sent to a single modem or both modems and whether to expect one terminal response or two terminal responses. Further, if a terminal response is expected from only one modem, then the toolkit arbitration module 114 may send the terminal response once it receives it from the respective modem. Where terminal responses are expected from two modems and the toolkit arbitration module 114 determines that at least one of the terminal responses has a result byte with a code other than success, the toolkit arbitration module 114 may send an overall failure response to the UICC 118 in response to such determination. In another aspect, where terminal responses are expected from two modems and the toolkit arbitration module 114 determines success without any additional data, then the toolkit arbitration module 114 may choose either of the terminal responses to be sent to the UICC 118.

Accordingly, the above-described routing logic can improve UE 110 performance by effectively handling communication between multiple baseband modems (112, 113) and the UICC 118.

Figure 2:
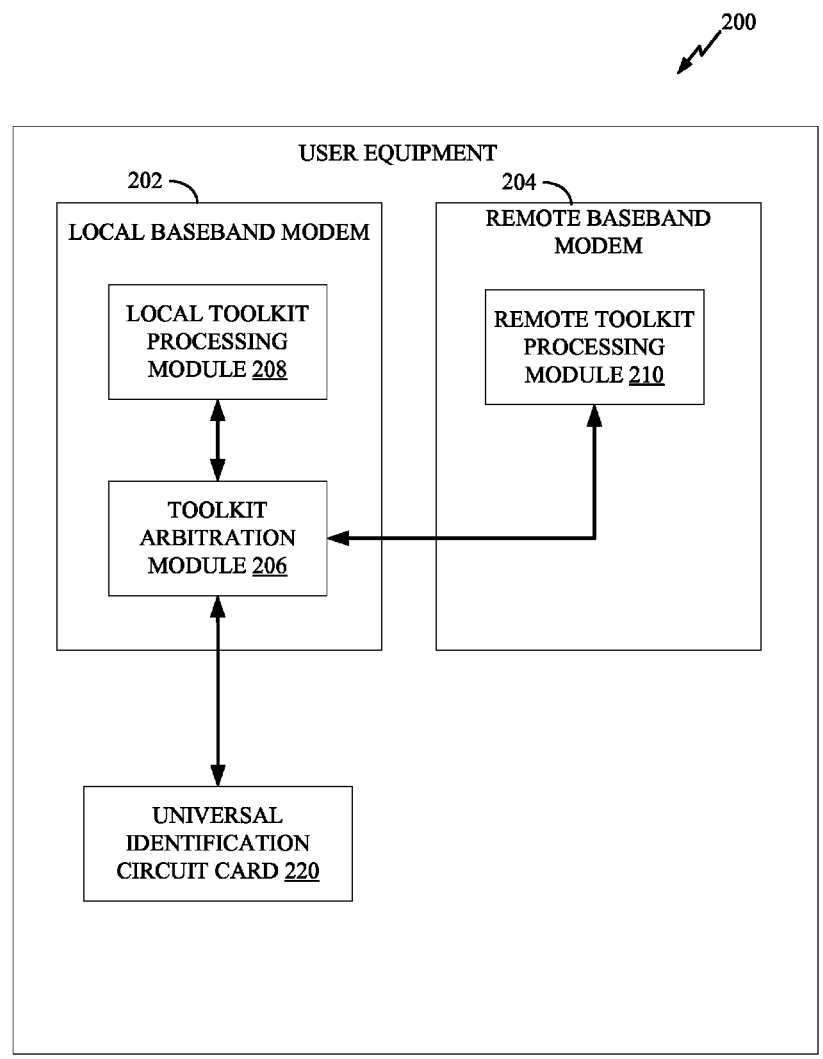
FIG. 2 depicts a block diagram of a UE with dual baseband modems and a universal identification circuit card (UICC) to implement various routing schemes for communications between the modems and the UICC, according to some embodiments.

FIG. 2 depicts a block diagram of a UE 200 with dual baseband modems (202, 204) and a universal identification circuit card (UICC) 220. The UE 200 can implement various routing schemes for communications between the baseband modems and the UICC 220, according to various aspects of this disclosure. With reference to FIG. 2, the UE 200 may include, by way of example, two baseband modems (202, 204) to implement communications with multiple RATs. The depiction of two baseband modems is not meant as limiting, but rather two baseband modems are merely depicted for clarity purposes. One of ordinary skill in the art would understand the system is not limited to two baseband modems. In one aspect, a baseband modem that is directly coupled to the UICC 220 is referred to as the local baseband modem 202, while any other baseband modems are referred to as a remote baseband modem 204. The remote baseband modem 204 communicates with the UICC 220 through the local baseband modem 202. However, in another aspect, the UICC 220 may be directly coupled to the remote baseband modem 204, and communicate with the local modem through the remote baseband modem 202. Still in another aspect, the UICC 220 may be directly coupled to both modems and may communicate with each modem directly without another intervening modem.

Figure 3:
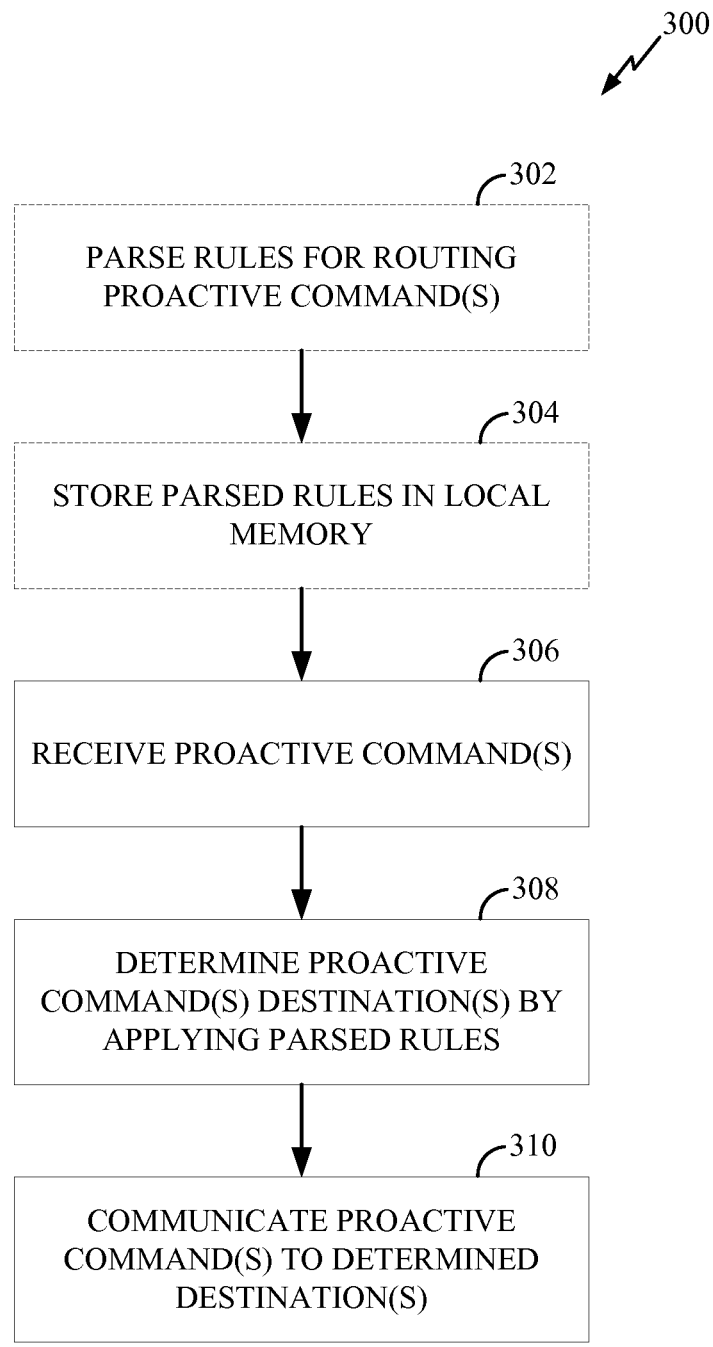
FIG. 3 depicts a flowchart describing a system for determining routing of communication originated from a UICC, according to some embodiments.
Figure 4:
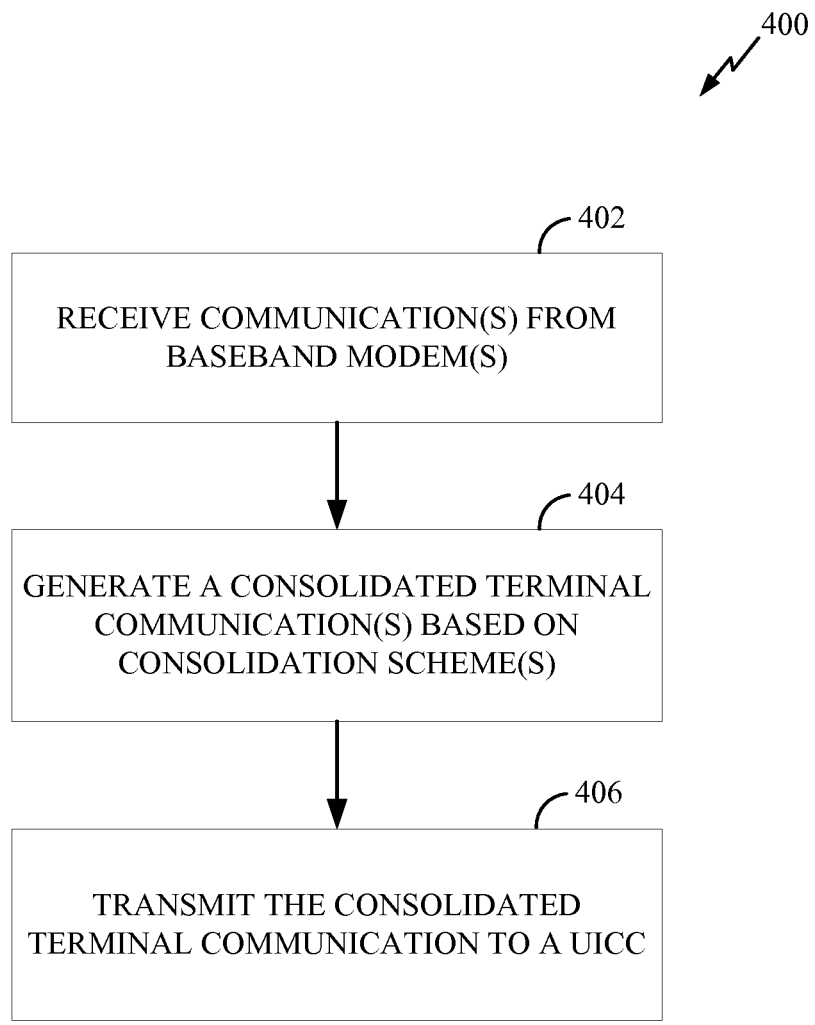
FIG. 4 depicts a flowchart describing a system for determining routing for communication originated from baseband modem(s), according to some embodiments.

The local baseband modem 202 may include a toolkit arbitration module 206 and a local toolkit processing module 208. The remote baseband modem 204 may include a remote toolkit processing modem 210. The toolkit arbitration module 206 may be operable to provide arbitration logic for routing communications (e.g., proactive commands) between the baseband modems (202, 204) and UICC 220. Thereafter, each baseband modem (202, 204) may use an associated toolkit process modules (208, 210) to process the communicated proactive commands. In some aspects, the toolkit arbitration module 206 may be located in both baseband modems or another component different from the baseband modems FIGS. 3 and 4 illustrate various methodologies in accordance with various aspects of the presented disclosure. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring the methodologies to computers. The term article of manufacture as used herein is intended to encompass a computer program accessible from any computer-readable device, carrier, media, or non-transitory memory.

FIG. 3 depicts a flowchart describing a system for determining routing of communication originated from a UICC, according to an aspect of this disclosure. At block 302, in an optional aspect, a UE (110 or 200) may parse rules for routing communications (e.g., proactive commands) between the UE and baseband modems upon power up of the UE. In one aspect, the UE may be operable to contemporaneously or concurrently communicate with multiple RATs through a local baseband modem and a remote baseband modem. In one aspect, the RATs may include LTE, CDMA, CDMA2000, GSM, UTRAN, E-UTRAN, TETRA, TD-SCDMA, etc. At block 304, in an optional aspect, the parsed routing rules may be stored in a local memory, which may be located in a local baseband modem, a remote baseband modem, both of the modems, or a suitable memory included in the UE.

At block 306, a UE can receive a proactive command from a UICC (e.g., 118 or 220). In one aspect, the local baseband modem is directly coupled to a UICC, and the remote baseband modem is not directly coupled to the UICC. That is, the UICC can directly communicate with the local modem. At block 308, the UE (or arbitration logic/module included in the UE) determines one or more destination baseband modems for the received proactive command by applying the parsed rules. In one aspect, the parsed rules include commands, such as, but not limited to: send the received proactive command to only one of the local baseband modem or the remote baseband modem, send the received proactive command to a modem that has a subscription to a comparatively higher priority RAT, send the received proactive command to a modem that has a preferred service status, send the received proactive command to the local baseband modem or the remote baseband modem based on a qualifier tag included in the proactive command, send the received proactive command to the local baseband modem or the remote baseband modem based on availability of one or more services through the local baseband modem or the remote baseband modem, etc. In one aspect, the service status includes one of normal service, limited service, and no service. For example, the proactive command may be sent to a baseband modem having a comparatively strong service status. At block 310, the UE communicates the proactive command to the one or more destination baseband modems based on the one or more determined destinations. In one aspect, the above-described system may be implemented using the toolkit arbitration module 114 or 206.

FIG. 4 depicts a flowchart describing a system for determining routing for communication originated from baseband modem(s), according to an aspect of this disclosure. At block 402, a UE (110, 200) may receive one or more communications from at least one of two or more baseband modems. In one aspect, the two or more baseband modems may include a local baseband modem (112, 202) and a remote baseband modem (113, 204). In one aspect, a received communication may include a terminal profile, an envelope response, a terminal response, etc. At block 404, the UE (e.g., a toolkit arbitration module 114 or 206) may generate a consolidated terminal communication from the communications received from the baseband modems. In one aspect, wherein the communication is a terminal profile, the consolidated terminal communication may be generated by combining the terminal profiles using a bitwise OR operation or other suitable operations. In another aspect, wherein the communication comprises an envelope response, the envelope response may include an identifier indicating a baseband modem that originated a corresponding envelope command. This identifier may be used to direct, in response to the envelope command, a modem response to at least one of the local baseband modem or the remote baseband modem based on the baseband modem identifier.

At block 406, the UE may transmit the generated consolidated terminal communication to a UICC (118, 220). In one aspect, wherein the communication is a terminal response, the UE may be aware whether a message (i.e., a proactive command) prompting the terminal response was sent to one of the local baseband modem or the remote baseband modem or both of the local baseband modem and the remote baseband modem. Where the message prompting the terminal response is sent to one of the baseband modems, the generated consolidated terminal communication may include a received terminal response. Where the message prompting the terminal response is send to both the local baseband modem and the remote baseband modem, the generated consolidated terminal communication may include one of the received terminal responses when both have been determined to be successful. By contrast, an overall failure may be communicated as the consolidated terminal communication when at least one of the terminal responses is unsuccessful.

Figure 5:
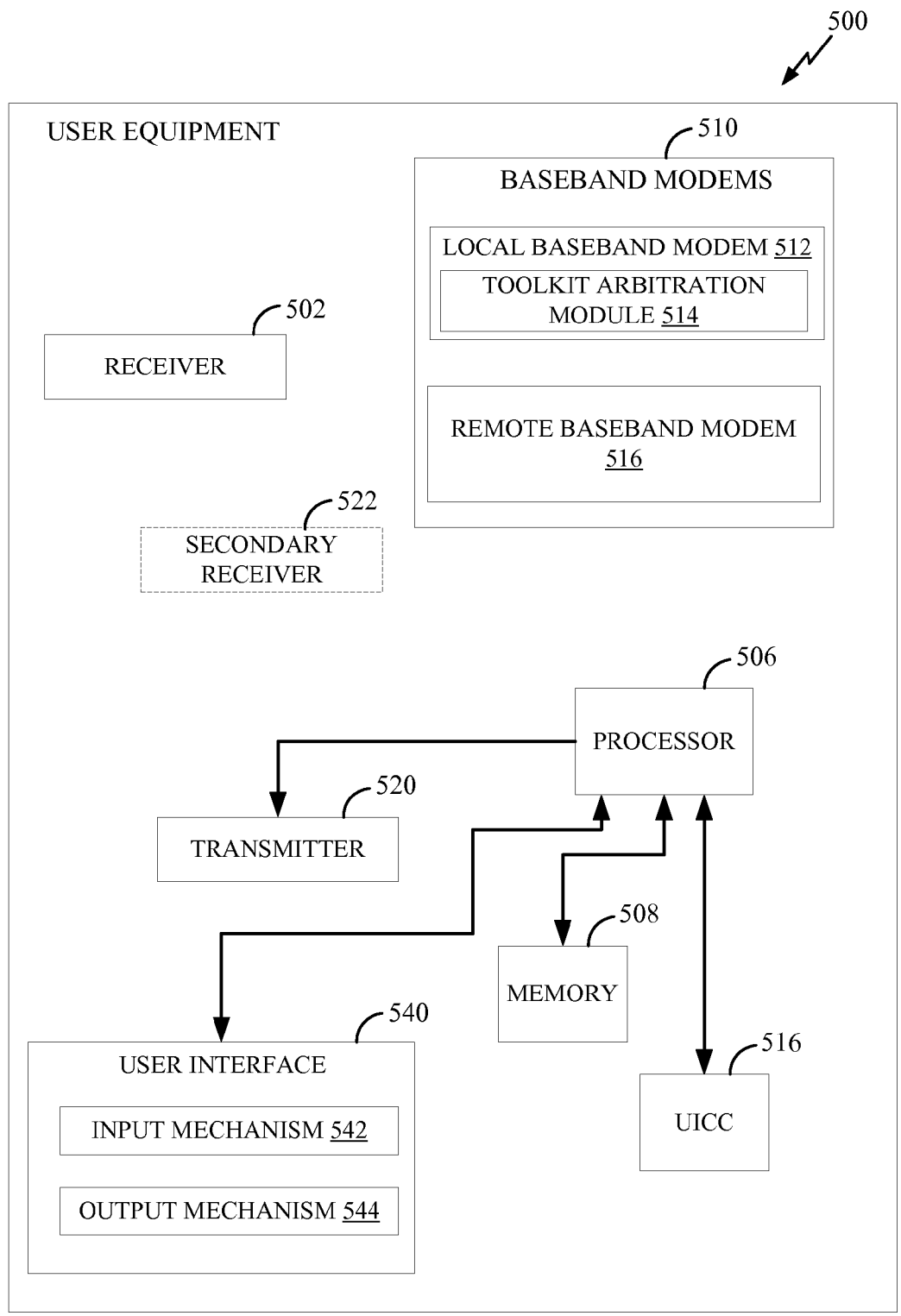
FIG. 5 depicts a block diagram of a hardware implementation of a UE with dual baseband modems and a UICC capable of implementing various routing schemes for communications between the modems and the UICC, according to some embodiments.

FIG. 5 depicts a block diagram of a hardware implementation of a UE 500 with dual baseband modems 510 and a UICC 516 capable of implementing various routing schemes for communications between the modems 510 and the UICC 516, according to an aspect of this disclosure. With reference now to FIG. 5, the UE 500 (e.g. a client device, a wireless communications device, etc.) is equipped with suitable logic for routing of communications (e.g., proactive commands, terminal profiles, terminal responses, envelope commands, envelope responses, etc.) among the baseband modems and the UICC 516. The UE 500 includes a receiver 502 that receives one or more signals from, for instance, one or more receive antennas (not shown), performs typical actions (e.g., filtering, amplifying, downconverting, etc.) on the received signal, and digitizes the conditioned signal to obtain samples. The receiver 502 may further include an oscillator that can provide a carrier frequency for demodulation of the received signal and a demodulator that can demodulate received symbols and provide them to a processor 506 for channel estimation. In one aspect, the UE 500 may further include a secondary receiver 552 and may receive additional channels of information.

The processor 506 may be a processor dedicated to analyzing information received by the receiver 502 and/or receiver 552, a processor that controls one or more components of the UE 500, and/or a processor that both analyzes information received by receiver 502 and/or receiver 552 and controls one or more components of the UE 500. The baseband modems 510 includes a local baseband modem 512, a remote baseband modem 516. The local baseband modem 512 includes a toolkit arbitration module 514 that is substantially similar to the toolkit arbitration modules 114 and 206 described above. The toolkit arbitration module 514 provides routing for communications between the UICC 516 and the baseband modems 510 according to routing rules, for example, like those described in reference to FIGS. 3 and 4. In some aspects, the toolkit arbitration module 514 may be located in the remote baseband modem 516, or both baseband modems. In still some aspects, the toolkit arbitration module 514 may be located in a component different from the baseband modems. In one aspect, the toolkit arbitration module 514 may be implemented by the processor 506 executing an application stored in the memory or another storage medium (not shown).

In one aspect, the processor 506, memory 508, and/or baseband modems 510 may provide means for receiving by the local baseband modem 512, a message (e.g., a proactive command) from the UICC 516, wherein the local baseband modem 512 is communicatively coupled to the UICC 516.

In another aspect, the processor 506, memory 508, and/or baseband modems 510 may provide means for determining one or more baseband modem destinations for the proactive command by applying one or more proactive command routing rules.

In another aspect, the processor 506 may provide means for receiving a communication (e.g., a terminal profile) from at least one baseband modem of two or more baseband modems 510, wherein the two or more baseband modems, for example, include the local baseband modem 512 and the remote baseband modem 516. In another aspect, the processor 506 may provide means for generating a consolidated terminal communication from the received communication from the at least one baseband modem of the two or more baseband modems based on one or more consolidation schemes, and means for transmitting the generated consolidated terminal communication to the UICC 516.

The UE 500 may additionally include a memory 508 that is operatively coupled to processor 506 and that can store data to be transmitted, received data, information related to available channels, and any other suitable information for estimating a channel and communicating via the channel. The memory 508 may additionally store protocols and/or algorithms associated with estimating and/or utilizing a channel (e.g., performance based, capacity based, etc.).

In one aspect, the UICC 516 may obtain system information through various messages provided by the toolkit arbitration module 514. In one aspect, the UICC 516 may include various modules or applications such as but not limited to, a subscriber information module (SIM), a CDMA Subscriber Identity Module (CSIM), etc. The UICC 516 may include a suitable memory storage medium (not shown) for storing the various information, modules, and/or applications described herein.

It will be appreciated that the data storage (e.g., memory 508, UICC 516) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The above described memory, data storage, and methods utilizing the same may include, without being limited to, any of the above described memories and any other suitable types of memory.

The UE 500 can further include multiple baseband modems 510. In one aspect, the baseband modems 510 may include a local baseband modem 512 and one or more remote baseband modems 516. As used herein, a baseband modem that is coupled to the UICC 516 is referred to as the local baseband modem 512, while any baseband modem not directly coupled to the UICC 516 is referred to as a remote baseband modem 516.

The local baseband modem 512 may include the toolkit arbitration module 514 and other local toolkit processing components (not shown). The remote baseband modem 516 may include suitable remote toolkit processing components (not shown). The toolkit arbitration module 514 may be operable to provide routing logic for handling commands (e.g., proactive commands) communicated between the baseband modems 510 and the UICC 516. Thereafter, each baseband modem (512, 516) may use an associated toolkit processing module to process the communicated proactive command. Operation of the toolkit arbitration module 514 is depicted in the flowcharts of FIGS. 3 and 4, for example.

Additionally, the UE 500 may include a user interface 540. The user interface 540 may include an input mechanism 542 for generating inputs into the UE 500, and an output mechanism 544 for generating information for consumption by the user of UE 500. For example, the input mechanism 542 may include a mechanism such as a key or keyboard, a mouse, a touch-screen display, a microphone, etc. Further, for example, the output mechanism 544 may include a display, an audio speaker, a hepatic feedback mechanism, a Personal Area Network (PAN) transceiver etc. In the illustrated aspects, the output mechanism 544 may include a display operable to present content that is in image or video format or an audio speaker to present content that is in an audio format.

Figure 6:
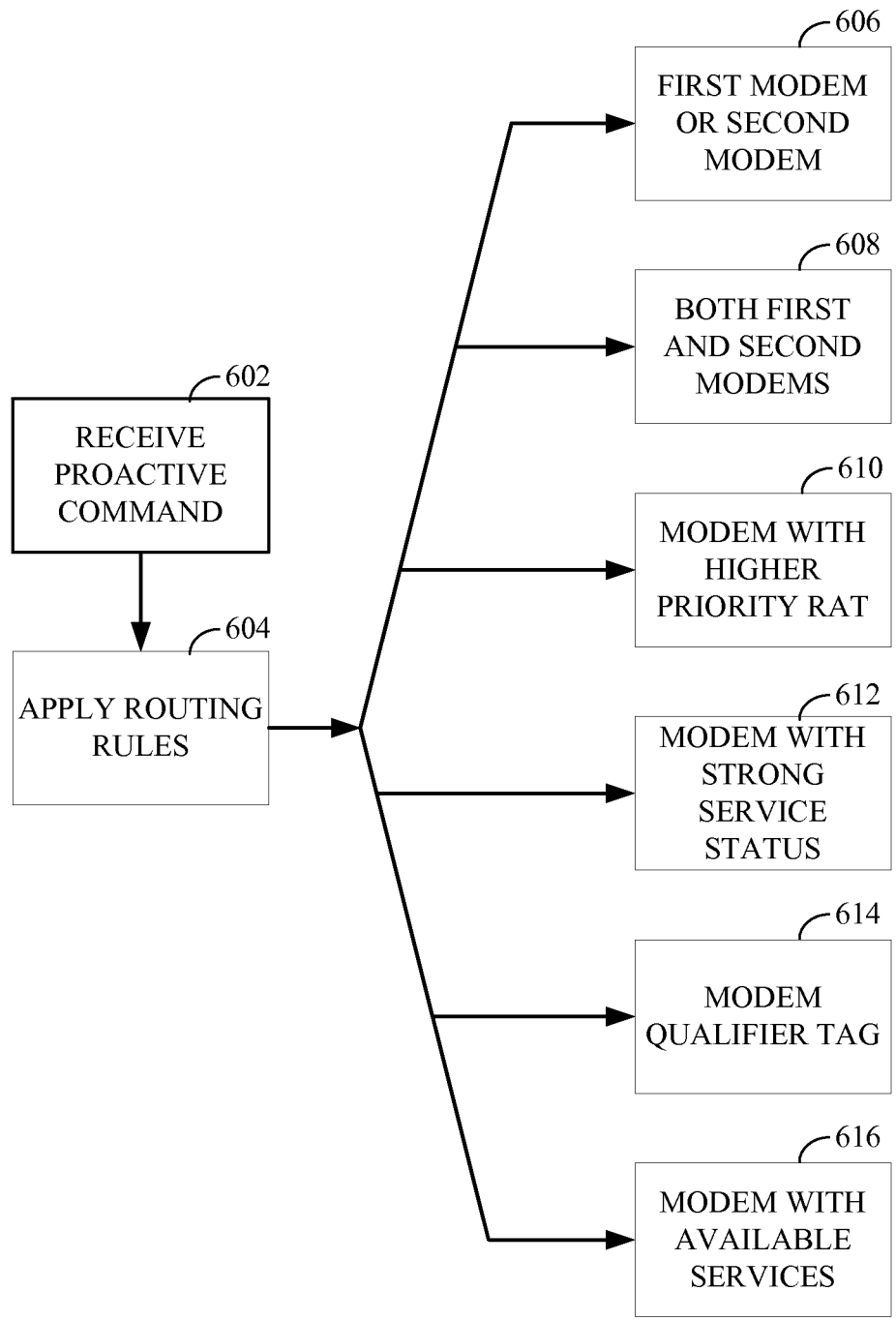
FIG. 6 is a flowchart illustrating routing rules of arbitration logic for handling proactive commands from a UICC, according to some embodiments.

FIG. 6 is a flowchart illustrating routing rules of arbitration logic for handling proactive commands according to one aspect of this disclosure. In block 602, the arbitration logic receives a proactive command from a UICC. In block 604, the arbitration logic applies the routing rules to route the proactive commands to a first modem (e.g., a local baseband modem) and a second modem (e.g., a remote baseband modem). In block 606, the arbitration logic may send the proactive command to only one of the first modem or the second modem. In block 608, the arbitration logic may send the proactive command to both the first modem and the second modem. In block 610, the arbitration logic may send the proactive command to a modem among the first and second modems that has a subscription to a comparatively higher priority radio access technology (RAT). In block 612, the arbitration logic may send the proactive command to a modem among the first and second modems that has a comparatively strong service status. In block 614, the arbitration logic may send the proactive command to the first modem or the second modem based on a qualifier tag included in the proactive command. In block 616, the arbitration logic may send the proactive command to the first modem or the second modem based on availability of one or more services through the first modem or the second modem.

Figure 7:
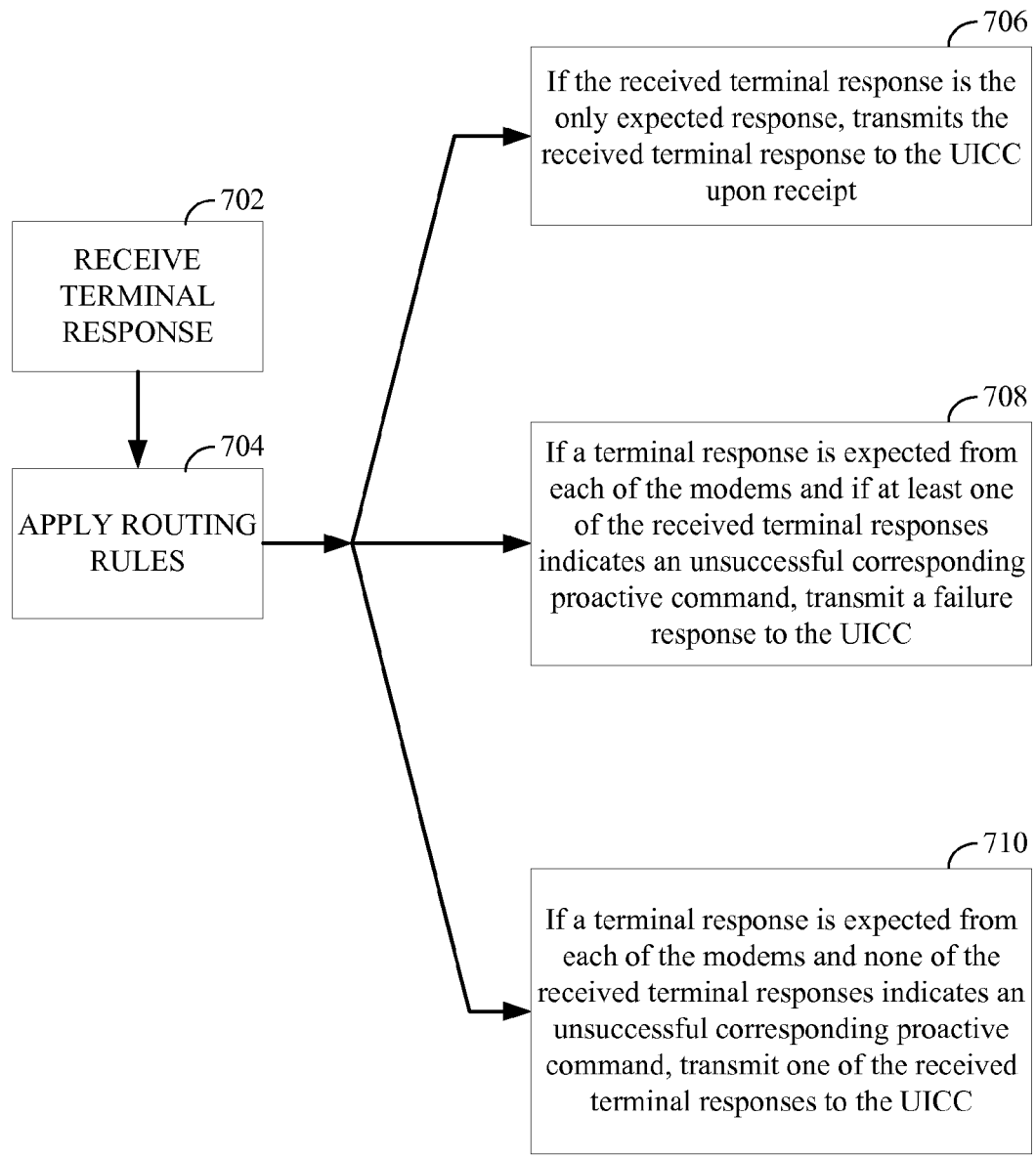
FIG. 7 is a flowchart illustrating routing rules of arbitration logic for routing terminal responses to a UICC, according to some embodiments.

FIG. 7 is a flowchart illustrating routing rules of arbitration logic for routing terminal responses to a UICC according to one aspect of this disclosure. In block 702, the arbitration logic receives a terminal response from a first modem (e.g., a local baseband modem) or a second modem (e.g., a remote baseband modem). In block 704, the arbitration logic applies the routing rules to handle the received terminal responses. In block 706, if the received terminal response is the only expected response, the arbitration logic may transmit the received terminal response to the UICC upon receipt. In block 708, if a terminal response is expected from each of the modems and if at least one of the received terminal responses indicates an unsuccessful corresponding proactive command, the arbitration logic may transmit a failure response to the UICC. In block 710, if a terminal response is expected from each of the modems and none of the received terminal responses indicates an unsuccessful corresponding proactive command, the arbitration logic may transmit one of the received terminal responses to the UICC.

Figure 8:
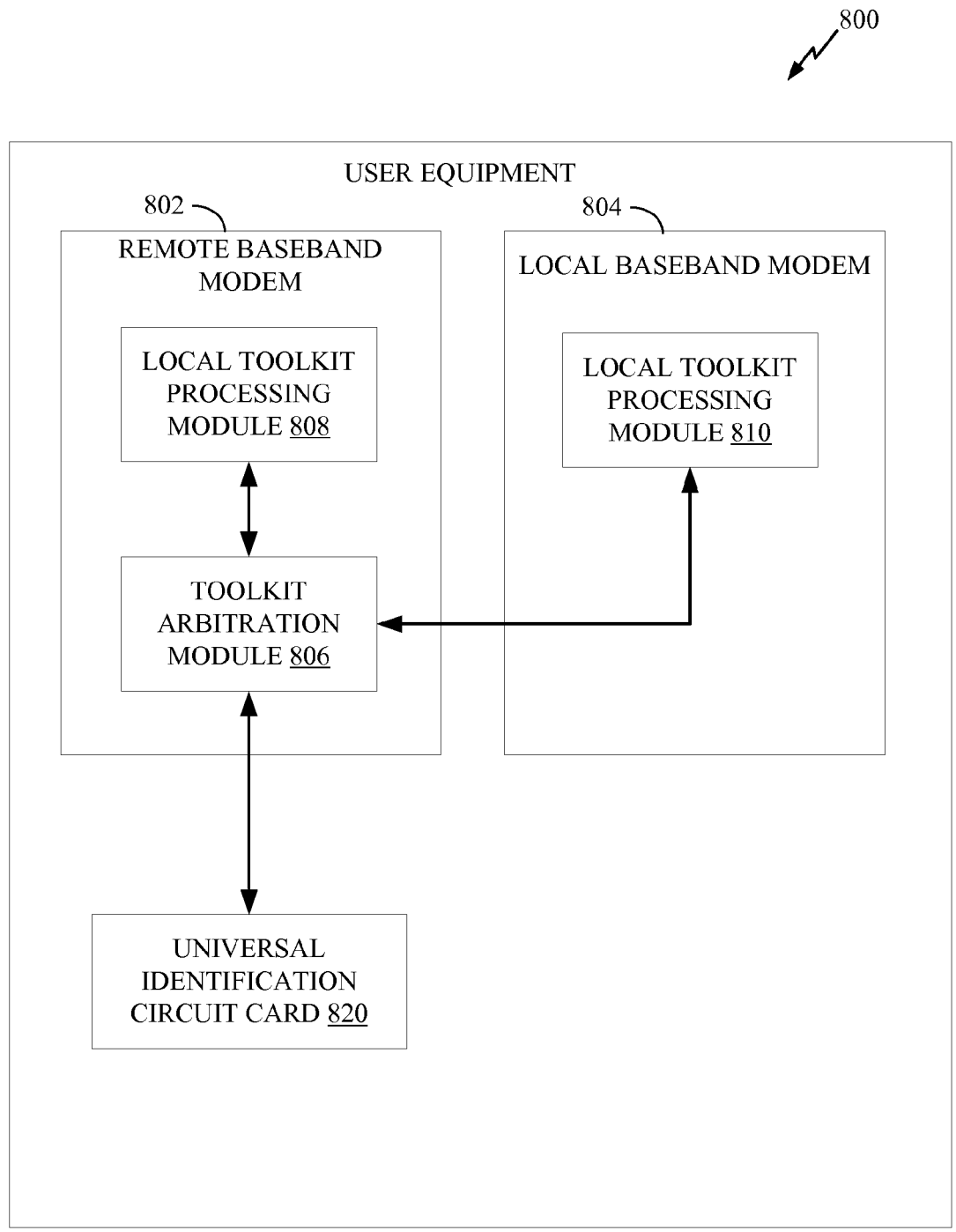
FIG. 8 depicts a block diagram of a UE with dual baseband modems and a UICC to implement various routing schemes for communications between the modems and the UICC, according to some embodiments.

FIG. 8 depicts a block diagram of a UE 800 with dual baseband modems (802, 804) and a universal identification circuit card (UICC) 820 to implement various routing schemes for communications between the baseband modems and the UICC 820, according to various aspects of this disclosure. With reference to FIG. 8, the UE 800 may include, by way of example, two baseband modems (802, 804) to implement communications with multiple RATs. The depiction of two baseband modems is not meant as limiting, but rather two baseband modems are merely depicted for clarity purposes. One of ordinary skill in the art would understand the system is not limited to two baseband modems. In one aspect, a baseband modem that is directly coupled to the UICC 220 is referred to as the remote baseband modem 802, while any other baseband modems are referred to as a local baseband modem 804. The local baseband modem 804 communicates with the UICC 820 through the remote baseband modem 802. However, in another aspect, the UICC 820 may be directly coupled to both modems and may communicate with each modem directly without another intervening modem.

The remote baseband modem 802 may include a toolkit arbitration module 806 and a remote toolkit processing module 808. The local baseband modem 804 may include a local toolkit processing modem 810. The toolkit arbitration module 806 may be operable to provide arbitration logic for routing communications (e.g., proactive commands) between the baseband modems (802, 804) and UICC 820. In one aspect, each baseband modem (802, 804) may use an associated toolkit process modules (808, 810) to process the communicated commands.

Furthermore, various aspects are described herein in connection with a user terminal (e.g., UE), which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminologies.

Moreover, the term "or" is intended to mean an inclusive "or" rather than an exclusive "or." That is, unless specified otherwise, or clear from the context, the phrase "X employs/includes/comprises A or B" is intended to mean any of the natural inclusive permutations. That is, the phrase "X employs/includes/comprises A or B" is satisfied by any of the following instances: X employs A; X employs B; or X employs both A and B. In addition, the articles "a" and "an"

as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA SC-FDMA, TDSCDMA, and other systems. The terms "system" and "network" are often used interchangeably. A CDMA system may implement a radio technology such as UTRA, CDMA2000, etc. UTRA includes Wideband-CDMA (W-CDMA) and other variants of CDMA. Further, CDMA2000 covers IS-2000, IS-95, and IS-856 standards. A TDMA system may implement a radio technology such as GSM. An OFDMA system may implement a radio technology such as E-UTRA, Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, CDMA2000 and UMB ate described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, and any other short- or long-range, wireless communication techniques.

Various aspects or features of the instant disclosure have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be-used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic devices, discrete gate, transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may include one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, a non-transitory medium, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal (e.g., UE). In the alternative; the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software; the functions may be stored or transmitted as one or more instructions or code on a computer-readable medium. The computer-readable media may include any suitable non-transitory computer storage media. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims, Furthermore, although elements of the described aspects and/or embodiments may be described or claimed in the singular; the plural is contemplated unless limitation to the singular is explicitly stated. Additionally, all or a portion of any aspect and/or embodiment may be utilized with all or a portion of any other aspect and/or embodiment, unless stated otherwise.

As used herein, a phrase referring to "at least one of" a list of items refers to any combination of those items, including single members. As an example, "at least one of: a, b. or c" is intended to cover: a, b, c, a-b, a-c, b-c, and a-b-c.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims and their equivalents.

What is claimed is:

1. A method of operating a mobile equipment for wireless communications, the method comprising:
    providing a mobile equipment comprising at least two modems and a universal integrated circuit card ("UICC") communicatively coupled to the at least two modems;
    arbitrating communication between the UICC and the at least two modems in accordance with arbitration logic;
    receiving a communication from each modem of the at least two modems, wherein the at least two modems comprise a first modem and a second modem, and wherein the communication comprises a first terminal profile from the first modem and a second terminal profile from the second modem;

performing a bitwise OR operation between the first terminal profile and the second terminal profile to generate a consolidated communication corresponding to the received communication from the at least two modems; and transmitting the generated consolidated communication to the UICC.

2. The method of claim 1, wherein the at least two modems comprises a local baseband modem and a remote baseband modem.

3. The method of claim 2, wherein the UICC is communicatively coupled to at least one of the local baseband modem or the remote baseband modem.

4. The method of claim 2, wherein the local baseband modem is directly coupled to the UICC, and the remote baseband modem is communicatively coupled to the UICC through the local baseband modem.

5. The method of claim 2, wherein the remote baseband modem is directly coupled to the UICC, and the local baseband modem is communicatively coupled to the UICC through the remote baseband modem.

6. The method of claim 2, wherein UICC is directly coupled to both the local baseband modem and the remote baseband modem.

7. The method of claim 2, wherein the arbitration logic is located in at least one of the local baseband modem or the remote baseband modem.

8. The method of claim 7, wherein the arbitration logic is located only in the local baseband modem.

9. The method of claim 7, wherein the arbitration logic is located only in the remote baseband modem.

10. The method of claim 7, wherein the arbitration logic is located in both the local baseband modem and the remote baseband modem.

11. The method of claim 1, wherein the at least two modems are configured for different radio access technologies.

12. The method of claim 1, further comprising:
parsing a configuration file that defines routing rules of the arbitration logic; and
storing the routing rules in a memory.

13. The method of claim 1, wherein the arbitrating communication comprises:
receiving a proactive command from the UICC; and
sending the proactive command to at least one of the at least two modems in accordance with arbitration logic.

14. The method of claim 13, wherein the at least two modems comprise a first modem and a second modem, and the arbitration logic comprises routing rules comprising at least one of:
sending the proactive command to only one of the first modem or the second modem;
sending the proactive command to both the first modem and the second modem;
sending the proactive command to a modem among the first and second modems that has a subscription to a comparatively higher priority radio access technology (RAT);
sending the proactive command to a modem among the first and second modems, that has a comparatively strong service status;
sending the proactive command to the first modem or the second modem based on a qualifier tag included in the proactive command; or
sending the proactive command to the first modem or the second modem based on availability of one or more services through the first modem or the second modem.

15. The method of claim 1, wherein the arbitrating communication further comprises: caching a first received communication from the at least two modems.

16. The method of claim 1, wherein the arbitrating communication comprises: receiving a terminal response, responsive to a proactive command from the UICC, from at least one of the at least two modems.

17. The method of claim 16, wherein the at least two modems comprise a first modem and a second modem, and the arbitration logic comprises routing rules comprising at least one of:
if the received terminal response is the only expected response, transmitting the received terminal response to the UICC upon receipt;
if a terminal response is expected from each of the modems and if at least one of the received terminal responses indicates an unsuccessful corresponding proactive command, transmitting a failure response to the UICC; and
if a terminal response is expected from each of the modems and none of the received terminal responses indicates an unsuccessful corresponding proactive command, transmitting one of the received terminal responses to the UICC.

18. The method of claim 1, wherein the arbitrating communication comprises:
receiving an envelope command with a modem identifier from one or more of the at least two modems; and transmitting the received envelope commands to the UICC.

19. The method of claim 18, the arbitrating communication further comprises:
receiving an envelope response with a modem identifier from the UICC; and
transmitting the received envelope response to the corresponding one of the at least two modems based on the modem identifier.

20. A computer program product, comprising:
a non-transitory computer-readable medium comprising code for operating a mobile equipment for wireless communications, wherein the mobile equipment comprises at least two modems and a universal integrated circuit card ("UICC") communicatively coupled to the at least two modems, the code comprising:
arbitrating communication between the UICC and the at least two modems in accordance with arbitration logic;
receiving a communication from each modem of the at least two modems, wherein the at least two modems comprise a first modem and a second modem, and wherein the communication comprises a first terminal profile from the first modem and a second terminal profile from the second modem;
performing a bitwise OR operation between the first terminal profile and the second terminal profile to generate a consolidated communication corresponding to the received communication from the at least two modems; and
transmitting the generated consolidated communication to the UICC.

21. An apparatus for wireless communications, comprising:
at least two modems;

a universal integrated circuit card ("UICC") communicatively coupled to the at least two modems;

means for arbitrating communication between the UICC and the at least two modems;

means for receiving a communication from each modem of the at least two modems, wherein the at least two modems comprise a first modem and a second modem, and wherein the communication comprises a first terminal profile from the first modem and a second terminal profile from the second modem;

means for performing a bitwise OR operation between the first terminal profile and the second terminal profile to generate a consolidated communication corresponding to the received communication from the at least two modems; and means for transmitting the generated consolidated communication to the UICC.

22. An apparatus for wireless communications, comprising:

at least two modems;

a universal integrated circuit card ("UICC") communicatively coupled to the at least two modems;

a memory; and at least one processor coupled to the memory, the UICC, and at least two modems, wherein the at least one processor is configured to:

arbitrate communication between the UICC and the at least two modems based on arbitration logic;

receive a communication from each modem of the at least two modems, wherein the at least two modems comprise a first modem and a second modem, and wherein the communication comprises a first terminal profile from the first modem and a second terminal profile from the second modem;

perform a bitwise OR operation between the first terminal profile and the second terminal profile to generate a consolidated communication corresponding to the received communication from the at least two modems; and transmit the generated consolidated communication to the UICC.

23. The apparatus of claim 22, wherein the at least two modems comprises a local baseband modem and a remote baseband modem.

24. The apparatus of claim 23, wherein the UICC is communicatively coupled to at least one of the local baseband modem or the remote baseband modem.

25. The apparatus of claim 23, wherein the local baseband modem is directly coupled to the UICC, and the remote baseband modem is communicatively coupled to the UICC through the local baseband modem.

26. The apparatus of claim 23, wherein the remote baseband modem is directly coupled to the UICC, and the local baseband modem is communicatively coupled to the UICC through the remote baseband modem.

27. The apparatus of claim 23, wherein UICC is directly coupled to both the local baseband modem and the remote baseband modem.

28. The apparatus of claim 23, wherein the arbitration logic is located in at least one of the local baseband modem or the remote baseband modem.

29. The apparatus of claim 28, wherein the arbitration logic is located only in the local baseband modem.

30. The apparatus of claim 28, wherein the arbitration logic is located only in the remote baseband modem.

31. The apparatus of claim 28, wherein the arbitration logic is located in both the local baseband modem and the remote baseband modem.

32. The apparatus of claim 22, wherein the at least two modems are configured for different radio access technologies.

33. The apparatus of claim 22, wherein the processor is further configured to:

parse a configuration file that defines routing rules of the arbitration logic; and store the routing rules in the memory.

34. The apparatus of claim 22, wherein the processor is further configured to:

receive a proactive command from the UICC; and send the proactive command to at least one of the at least two modems in accordance with arbitration logic.

35. The apparatus of claim 34, wherein the at least two modems comprise a first modem and a second modem, and the arbitration logic comprises routing rules comprising at least one of:

sending the proactive command to only one of the first modem or the second modem;

sending the proactive command to both the first modem and the second modem;

sending the proactive command to a modem among the first and second modems, that has a subscription to a comparatively higher priority radio access technology (RAT);

sending the proactive command to a modem among the first and second modems, that has a comparatively strong service status;

sending the proactive command to the first modem or the second modem based on a qualifier tag included in the proactive command; or sending the proactive command to the first modem or the second modem based on availability of one or more services through the first modem or the second modem.

36. The apparatus of claim 22, wherein the processor is further configured to cache a first received communication from the at least two modems.

37. The apparatus of claim 22, wherein the processor is further configured to receive a terminal response, responsive to a proactive command from the UICC, from at least one of the at least two modems.

38. The apparatus of claim 37, wherein the at least two modems comprise a first modem and a second modem, and the arbitration logic comprises routing rules comprising at least one of:

if the received terminal response is the only expected response, transmitting the received terminal response to the UICC upon receipt;

if a terminal response is expected from each of the modems and if at least one of the received terminal responses indicates an unsuccessful corresponding proactive command, transmitting a failure response to the UICC; and if a terminal response is expected from each of the modems and none of the received terminal responses indicates an unsuccessful corresponding proactive command, transmitting one of the received terminal responses to the UICC.

39. The apparatus of claim 22, wherein the processor is further configured to:

receive an envelope command with a modem identifier from one or more of the at least two modems; and transmit the received envelope commands to the UICC.

40. The apparatus of claim 39, wherein the processor is further configured to:

receive an envelope response with a modem identifier from the UICC; and transmit the received envelope response to the corresponding one of the at least two modems based on the modem identifier.

\* \* \* \* \*